Oct. 24, 1967 L. ROLLIN 3,348,857
CONVERTIBLE TWO-WHEELED CARRIER
Filed Dec. 3, 1965 3 Sheets-Sheet 3

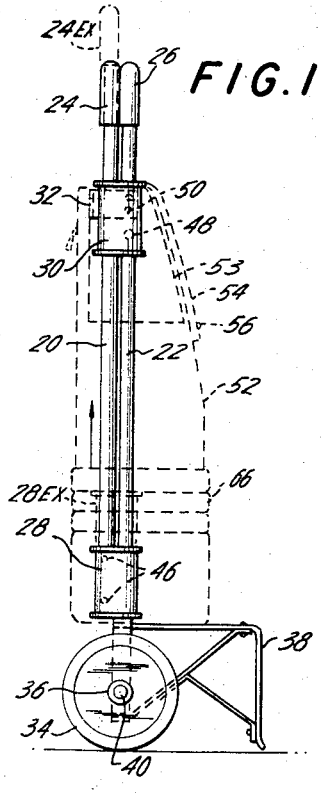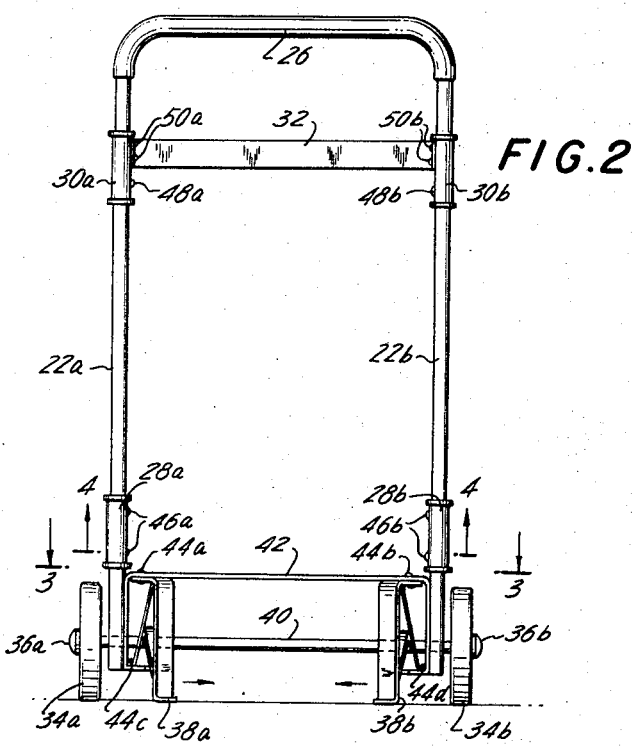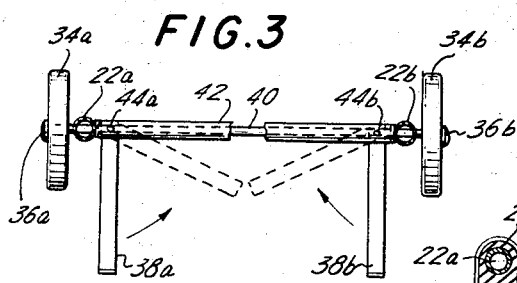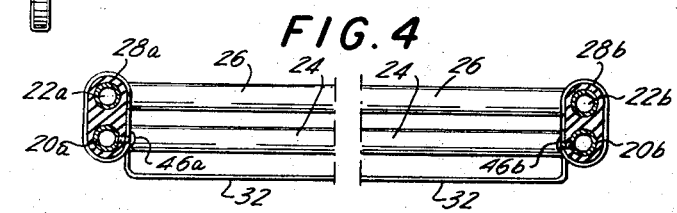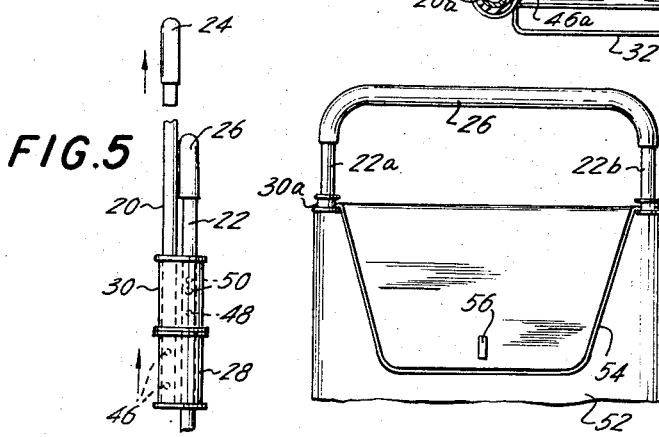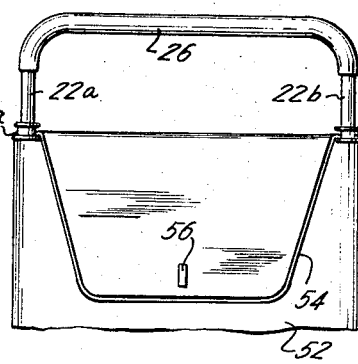
INVENTOR.
LIBBY ROLLIN
BY
ATTORNEYS

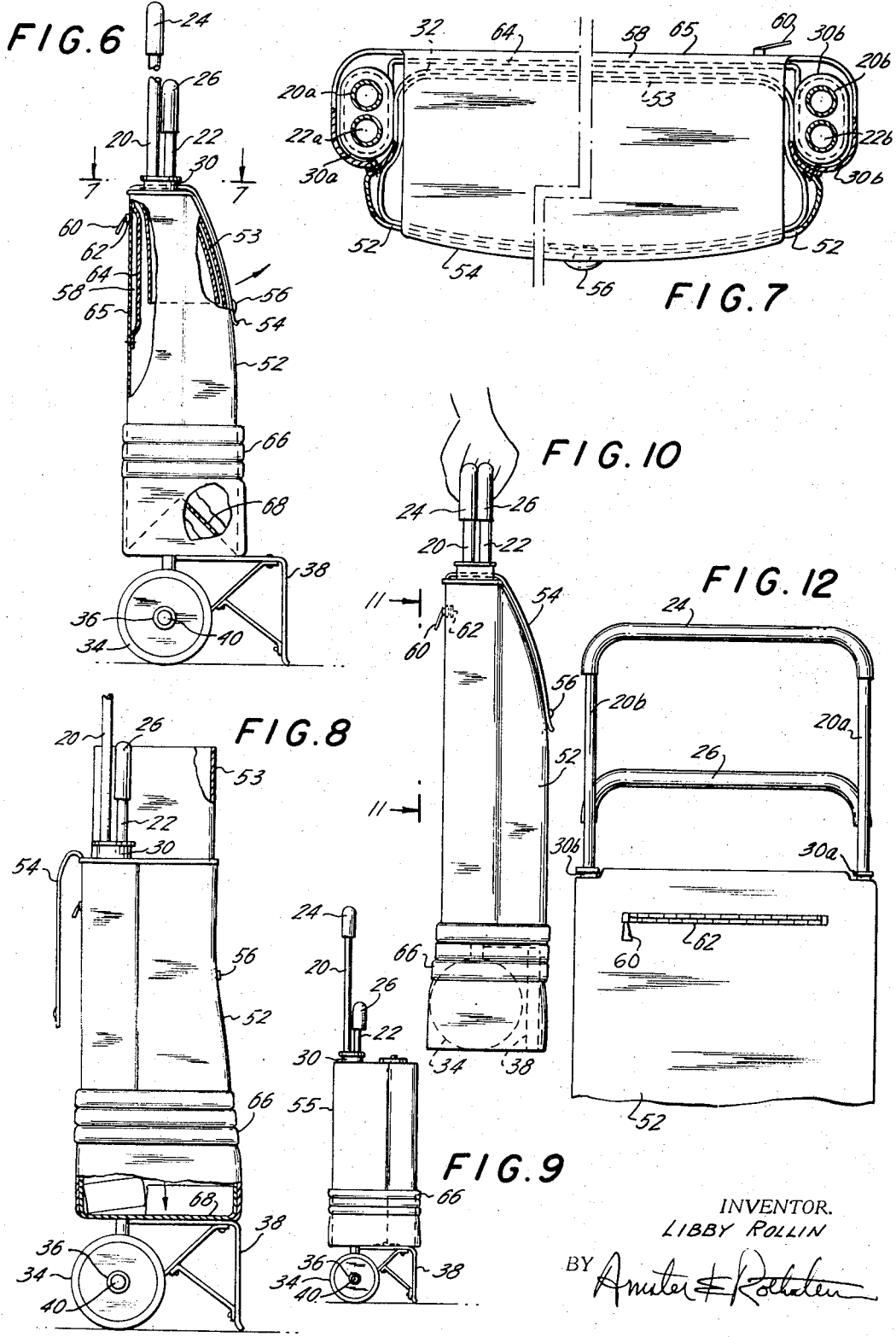

INVENTOR.
LIBBY ROLLIN
BY
ATTORNEYS

United States Patent Office 3,348,857
Patented Oct. 24, 1967

3,348,857
CONVERTIBLE TWO-WHEELED CARRIER
Libby Rollin, 101 Ellwood Ave.,
Mount Vernon, N.Y. 10552
Filed Dec. 3, 1965, Ser. No. 511,388
5 Claims. (Cl. 280—36)

ABSTRACT OF THE DISCLOSURE

A carrying cart which is convertible between an extended position for rolling movement and a retracted position for carrying movement. An extendable handle is slidably mounted on the carrier's frame and can be elevated to give proper leverage and balance for rolling movement. The frame carries a bag or receptacle and has underlying braces which can be swung out to give standing support to the cart. In its carrying mode, the handle is coextensive with the frame. A flexible skirt feature allows the wheels and braces to be covered when the cart is to be carried.

This invention relates to portable carrying containers and more particularly to such containers which are convertible and therefore adaptable for a plurality of uses.

In recent years, there has been an increased demand for various types of carrying containers in many fields. These fields, although not always directly related to one another, nevertheless often have certain basic aspects in common; that is, they all require convenient carrying means for supporting and transporting certain basic articles. Thus, for example, a general "carrying container" need is satisfied by such items as pocketbooks, purses, shopping bags and carts, luggage carriers, valises, "tote" bags, golf bags and carts, etc. Usually, such containers are made as attractive as possible, as well as light, and even occasionally quite compact.

But insufficient emphasis has been placed on the convertible container which can serve many of the above purposes and still maintain an attractive appearance. Where such a problem may have been recognized in the past, unfortunately the solutions have often been inferior in both design and appearance to the novel structure herein disclosed.

It is therefore an object of this invention to provide an improved carrying container to obviate one or more of the aforesaid difficulties.

It is a further object of this invention to provide such a container which is convertible so as to serve a variety of uses.

In one particular illustrative embodiment of this invention, a container may be utilized as either a pocketbook or tote bag on the one hand and by appropriate conversion means, as a shopping cart on the other hand. The same basic structure is also adaptable for use as a luggage carrier, with provision for a "built-in" valise. This versatile carrying container is constructed of a basic stationary frame with two parallel side members which join by means of a rounded upper handle member. An adjustable frame with similarly proportioned side and upper members is coupled to the stationary frame at each of the side members thereof by cylindrical slides. There are included an upper stationary pair of such slides through which the adjustable frame can pass, and a lower pair of slides adapted to move along the length of the side members of the stationary frame.

The base of the stationary frame includes an axial member bridging the side members and acting as the axle for wheels on either side of the side members. The base further includes two braces, one at either end of the above-mentioned axial member, adapted to be swung out in a horizontal plane to a position perpendicular to the plane of the frame when the invention is to be used as a shopping cart or luggage carrier; the braces can be swung inwardly to a position adjacent to the axial member when use of the invention as a pocketbook or tote bag is desired.

The actual carrying of objects by the invention utilized as a pocketbook or shopping cart may be achieved, for example, through the use of a fastenable bag of firm rubberized or plasticized fabric attached to the frame. The bag may be sufficiently pleated along its sides and bottom to allow for expansion when used as a shopping cart, but it can remain in a relatively flat retracted position for attractive use as a pocketbook. In addition, a collapsible inner lining can extend upward for additional carrying space in the shopping cart embodiment. Thus, when use as a pocketbook is in fact desired, the extendable frame is placed in a retracted position completely contiguous with the stationary frame along both its slide members and its upper rounded handle. In addition, the two braces are folded in and an attractive elasticized skirt is drawn down from the lower section of the fastenable bag to cover the base structure and thereby eliminate from view the two braces, the wheels, and the remaining base members.

On the other hand, when use as a shopping cart is desired, the adjustable frame is extended by sliding it upward to a position where the lower sliding pieces are adjacent to the upper stationary sliding pieces. The fastenable bag may be expanded outwardly to take advantage of the extra carrying space provided by the pleated sides and bottom of the rubberized fabric of which the bag is made. Moreover, the inner lining is extracted from within the bag and assumes its upper position atop the bag. In addition, the attractive elasticized skirt is raised to expose the wheels and lower braces, and assumes a decorative position surrounding the lower section of the bag. The wheels are now available to provide rolling movement of the container, and when the braces are swung outward as discussed above, they are now available for providing support for the container should its operator desire to leave it in a stationary standing position.

The invention can assume its luggage carrier form by mounting a valise on the stationary and adjustable frames, the wheels and the supporting braces. The valise, when empty, can have the adjustable frame in a retracted position and the wheels and braces concealed by an elasticized skirt, thereby providing a piece of luggage suitable for carrying. When the valise is filled and perhaps quite heavy, the adjustable frame can be extended, the skirt raised, and the braces swivelled out. Instead of the usual strain associated with carrying such a heavy piece of luggage, convenient and comfortable rolling motion is thereby achieved.

It is therefore a feature of this invention that a carrier with stationary and adjustable frames is utilized as a pocketbook or tote bag, as a shopping cart, or as a luggage carrier.

It is another feature of this invention that a fastenable bag of firm rubberized material is mounted on a carrier and can assume a first relatively flat position when the carrier is acting as a pocketbook, and a second relatively expanded position when the carrier is acting as a shopping cart.

Still another feature of this invention includes means for mounting the fastenable bag or a valise on the frame body of a carrier which includes wheels and adjustable braces, and an elasticized skirt which can be placed around the wheels and braces for decorative purposes when the carrier is to be used as a pocketbook or valise to be carried, which can assume a higher position to expose the wheels and braces when the carrier is to be used as a shopping cart or a rolling luggage container.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawings, wherein:

FIG. 1 is a side view of a carrier in accordance with the invention with an adjustable frame being shown in retracted position and adjustable braces having been swung outward, as well as a fastenable bag and collapsible lining shown in a phantom view;

FIG. 2 is a front view of a carrier with the adjustable braces swung slightly inward to indicate the structure thereof;

FIG. 3 is a sectional view taken along line 3—3 of FIG. 2, and showing the braces swung out with a phantom representation of the braces in an inner position;

FIG. 4 is a sectional view taken along the line 4—4 of FIG. 2 showing the side members of the adjustable and stationary frames, the cylindrical slides telescopically attached thereto, and an upper strut;

FIG. 5 is a fragmentary side view of a carrier in accordance with the invention with the adjustable frame in its extended position, showing the upper and lower cylindrical slides in abutting relation;

FIG. 6 is a side view of a carrier with the braces swung outward, including a fastenable bag, mounted on the frames, and including a fragmentary view of the adjustable handle in its extended position and exploded view of a rear pouch, a collapsible inner lining and a lower enclosed pleated bottom on the bag;

FIG. 7 is a sectional view taken along the line 7—7 of FIG. 6 showing the mounting of the fastenable bag on the carrier frames;

FIG. 8 is a side view of the invention utilized as a shopping cart with the fastenable bag in an expanded position, with its inner lining upwardly extended, and the adjustable handle shown extended in a fragmentary view;

FIG. 9 is a side view of the invention utilized as a luggage carrier with a valise mounted on the frame;

FIG. 10 is a side view of the carrier used as a pocketbook or tote bag, with the fastenable bag and the adjustable handle in retracted position, and an elasticized skirt drawn down to cover the wheels and adjustable braces;

FIG. 11 is a fragmentary rear view of the fastenable bag of the carrier, showing particularly the rear concealed pouch and a zipper fastener therefor;

FIG. 12 is a fragmentary front view of the fastenable bag of the carrier, showing particularly the fastenable front flap thereof;

Figure 14:
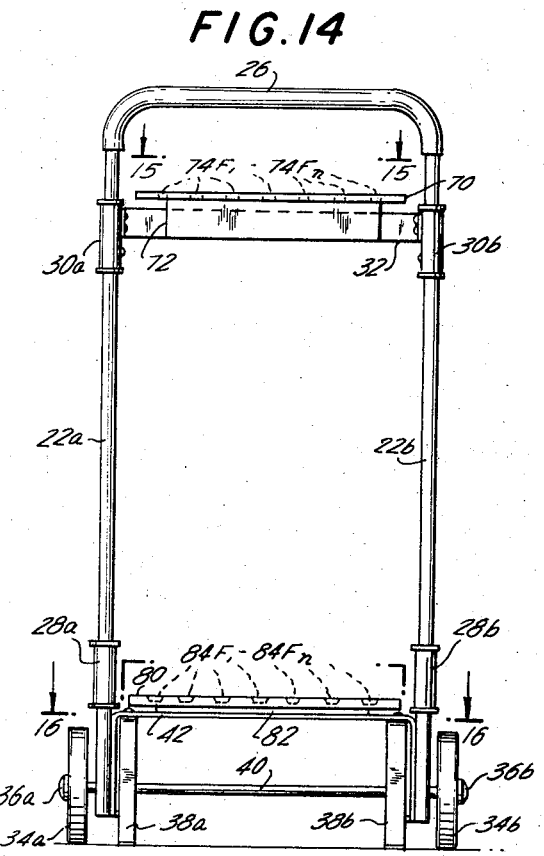
FIG. 14 is a front view of the carrier used as a golf cart.
Figure 15:
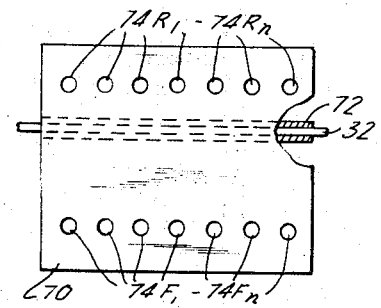
Figure 16:
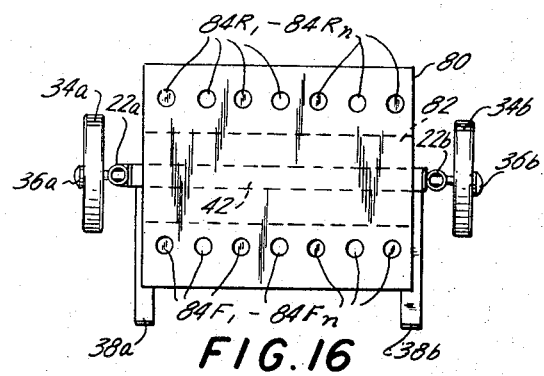

FIG. 15 is a view taken from the line 15—15 of FIG. 14 showing an upper plate mounted on the carrier's upper strut, with holes in the upper plate for receiving a plurality of golf clubs; and FIG. 16 is a sectional view taken along the line 16—16 of FIG. 14 and showing a lower plate mounted on to the carrier frame with recesses in said lower plate for receiving the handles of golf clubs placed in the cart.

Referring to the side and front views of this all-purpose carrier shown in FIGS. 1 and 2, it can be seen that an adjustable frame comprising handle 24 and tubular side members 20a and 20b (hidden by tubular side members 22a and 22b in FIG. 2) is coupled to a stationary frame comprising handle 26 and tubular side members 22a and 22b by means of lower slides 28a and 28b and upper slides 30a and 30b. As shown in FIG. 1, lower slide 28 encircles the lower part of side member 22 and is bolted by means of bolts 46 to the lower part of side member 20 of the adjustable frame. Thus, slide 28 can move vertically upwards along the side member 22 when the adjustable frame is extended to a position indicated symbolically by position 24EX of its handle and 28EX of the lower slide. The upper slide 30 is stationary due to its being bolted to the side member 22 of the stationary frame through bolts 48. It also remains in place due to the bolting therethrough of the upper horizontal strut 32 which provides lateral support to the frame. This construction allows the side members 20 of the movable frame to pass through the stationary slide 30 as it is moved to its extended position referred to above.

Side members 22a and 22b shown in FIG. 2 project downward below the bottom of the adjustable slides 28a and 28b to provide mounting positions for wheels 34a and 34b. Axle 40 passes through mounting holes in each of the side members 22a and 22b and the wheels are affixed thereto by means of nuts 36a and 36b. Adjustable braces 38a and 38b are pinned to the lower horizontal strut by bolts 44a and 44b and bolts 44c and 44d. The braces 38a and 38b can swivel into a collapsed inner position (shown in phantom in FIG. 3) depending upon the use that is desired for the carrier.

An outline of a possible illustrative bag to be used with the carrier is indicated in the phantom view as element 52 in FIG. 1. The varied uses of such a bag will be detailed below, but at this stage of the description, all that is shown in outline form is a closable flap 54 fastened to the bag by means of fastener 56, and a collapsed inner lining 53, adapted to be raised to provide greater carrying capacity as shown, for example, in FIG. 8. In addition, elasticized skirt 66 is positioned around the lower portion of the bag 52 and as will be seen in greater detail below, can be dropped to conceal the braces 38 and wheels 34.

The sectional view taken along the line 3—3 of FIG. 2 is shown in FIG. 3; this illustrates the construction of the lower wheeled base of the carrier. Specifically, there can be seen the lower projections of side members 22a and 22b through which passes the axle 40, the wheels 34a and 34b being attached to the axle 40 by means of nuts 36a and 36b respectively. Braces 38a and 38b are shown pinned to the lower strut 42 by means of bolts 44a and 44b. Moreover, the solid outline of braces 38a and 38b show them in their outer extended positions when support for the carrier is desired. The phantom showing of these braces along with the accompanying arrows indicate the inner position which the braces 38a and 38b may assume when no bracing support for the carrier is required. Thus, when use as a pocketbook is needed, the braces may be swivelled inwardly and covered appropriately when the elasticized skirt 66 is lowered over both the wheels and the braces.

In FIG. 4 is illustrated an upwardly directed sectional view taken along the line 4—4 of FIG. 2. It is noted that side members 22a and 22b of the stationary frame are encased within lower movable slides 28a and 28b. On the other hand, side members 20a and 20b are fixably bolted to lower movable slides 28a and 28b by means of bolts 46a and 46b respectively. It can thereby be appreciated that when the handle 24 of the adjustable frame is extended, the movable slides 28a and 28b are adapted to move upwardly along the length of side members 22a and 22b of the stationary frame.

A clear understanding of the appearance of a portion of the carrier can be acquired by reference to FIG. 5. In this partial view of the invention's upper section, the handle 24 and the side members 20 have been shown extended to their maximum upward position. This occurs when slides 28 move in an upward direction along the side members 22 of the stationary frame. The maximum upward extension of the adjustable frame is determined by the position of the stationary slides 30. When the adjustable frame is extended to a position whereby the upper surface of slides 28 are abutting the lower surface of slides 30, the maximum extension of the adjustable frame has been reached. The clearance between the slides 28 and the side members 22 of the stationary frame is such that a snug fit is provided therebetween, allowing the adjustable frame to remain in the extended position shown in FIG. 5 without additional fastening mechanisms. On the other hand, simple manual pressure can cause the adjustable frame to assume its normal retracted position as shown, for example, in FIGS. 1 and 2, whereby the lower surfaces of slides 28a and 28b abut the upper surface of lower horizontal strut 42.

In FIG. 6 the handle 24 of the adjustable frame is fragmentarily pictured in the extended position and a fastenable bag 52 is in its relatively flat retracted position. In addition, a collapsible inner lining 53 is shown in an exploded view within the bag 52. What it is desired to utilize the invention as a shopping cart as shown in FIG. 8, the adjustable frame is moved to its extended position and the bag 52 is made to assume its relatively deeper expanded position. The lining 53 is also lifted out and extended upward as shown in FIG. 8; this provides additional carrying space. These steps can be achieved through the use of suitable expandable fabric for the material of the bag. On the other hand, FIG. 9 shows the invention used as a luggage carrier, while FIG. 10 indicates the manner in which the invention may be employed as a pocketbook or tote bag, whereby the adjustable skirt 66 has been lowered to cover the concealed wheels 34 and braces 38 and the bag 52 is in a relatively flat position with handle 24 of the adjustable frame retracted.

A study of FIG. 6 therefore reveals that the bag 52 surrounds the side members 20 and 22 of the adjustable and stationary frames, and its bottom surface partially rests on the upper surface of the braces 38. With the bag 52 in its relatively flat retracted position as shown in FIG. 6, the foldable bottom panel 68 of the bag 52, advantageously comprising a firm rubberized or plasticized fabric, is in its raised position as shown in an exploded view thereof in FIG. 6. The lining 53 is similarly in a collapsed position around the inner walls of bag 52.

The exploded segments of FIG. 6 also indicate that bag 52 can advantageously include a rear fastenable pouch 58. This pouch 58 comprises a rear panel 64 which is sewn or otherwise affixed to the inner surface of rear wall 65 of the bag 52. A hanging tab 60 attaches to the fastening zipper 62 which opens and closes the pouch 58. Thus, ready and convenient access to the pouch 58 can be had without necessarily going into the main portion of the bag 52 which is covered by flap 54 and fastened to the bag by catch 56.

A fuller appreciation of the relationship between the pouch described above and the bag and carrier can be obtained from FIG. 7 which is a sectional view taken along the line 7—7 of FIG. 6. This view indicates from above how the pouch 58 is in effect comprised of the inner surface of rear wall 65 of the bag 52 and specially affixed panel 64. The wall 65 of the bag 52 can be made to completely surround the side members 20a and 20b and 22a and 22b of the adjustable and stationary frames respectively. The raisable lining 53 is shown in its collapsed or stored position inside the bag 52.

Referring to the embodiments of the invention shown in FIGS. 8 and 9, the invention may be used as a shopping cart when the fastenable and expandable bag 52 is mounted on the carrier (FIG. 8), or as a luggage container when the valise 55 is mounted thereon (FIG. 9). For use as a shopping cart, the fastenable bag 52 is shown in FIG. 8 to have assumed its relatively deeper expanded position. This can be attributed in part to the firm elastic quality of the fabric chosen to make up the bag, in part to the flattened position of foldable panel 68 which is depressed when the bag 52 assumes its expanded position, and also in part to the inclusion within the carrying space of bag 52 of several bulky packages which also serve to maintain the bag 52 in such an expanded position. Some of these packages and the foldable position of the panel 68 are shown in a fragmentary exploded view towards the bottom of the bag 52 in FIG. 8. Furthermore, additional carrying space is provided by the raising of lining 53 to its elevated position. The lining 53 maintains this raised orientation due to its fabric composition and to its creased edges, as well as to packages enclosed within it.

To provide the requisite leverage in the embodiment of FIG. 8, the adjustable frame is moved upward to its extended position, the side members 20 of the adjustable frame sliding through the stationary slides 30 as indicated above. The skirt 66 surrounding the lower portion of the bag 52 is advantageously made of an attractive elasticized material, thereby allowing its positioning around the appropriate segment of the bag 52, just above the braces 38.

The luggage carrier embodiment of FIG. 9 contemplates the mounting of a valise 55 on the adjustable and stationary frames of the invention. The handles 24 and 26 of the frames when together act as the carrying handles of the valise 55, generally when the valise 55 is relatively empty and therefore light. At such times, an attractive elasticized skirt 66 will be drawn down to cover the wheels 34 and braces 38 in an inner "stored" position. When the valise 55 is more heavily loaded, however, rolling rather than carrying the container is desired. This is effectuated by drawing up the skirt 66 to expose the wheels 34 and the braces 38 in a swivelled-out "operative" position; in addition, handle 24 of the adjustable frame is extended upward to furnish the needed rolling leverage.

Since FIGS. 8 and 9 show embodiments in which possible standing support for the carrier would be desired, braces 38 are swung to their outward position, perpendicular to the axle element 40 between wheels 34. In this position, the braces 38 also provide terminal support at either end of the bag 52 or valise 55, the position of the braces being visible in FIG. 2 for example.

With the handle 24 extended and bag 52 and lining 53 expanded, or with valise 55 heavily loaded, the invention used respectively as a shopping cart or luggage carrier can be simply tilted and rolled along on wheels 34. If it should be desired to rest the carrier in an upright position, it can assume the stance shown in FIGS. 8 and 9, whereby standing support is provided both by the stationary wheels 34 and the braces 38.

To utilize the invention as a pocketbook or tote bag, the fastenable bag 52 should assume its relatively flat retracted position as shown in FIG. 10. This can be achieved by raising foldable panel 68 (see FIG. 6), and by removing the relatively bulky packages which helped to maintain bag 52 in its expanded position. The inner lining 53 (FIGS. 6 and 8) is returned to its collapsed position. In order to provide convenient and comfortable carrying means for the invention in this mode, the adjustable frame is placed in its retracted position whereby its handle 24 is made to be contiguous with handle 26 of the stationary frame. Lower slides 28 thereby return to abutting relationship with the upper surface of lower horizontal strut 42 as explained above with relation to FIGS. 1 and 2. In accordance with a feature of this invention, the aesthetic appearance of the carrier when utilized as a pocketbook is improved by lowering the elasticized skirt 66 so that it covers the wheels 34 and the braces 38 which have been swivelled to their inner position. The carrier is so proportioned that when the skirt 66 conceals the wheels 34 and the braces 38, the distance between the handles 24 and 26 and the bottom of the skirt 66 is appropriate for a fashionably styled long pocketbook or tote bag. Access to the carrying areas of the bag is still had through the flap 54 or through the zipper 62 into the pouch 58 (not shown in FIG. 10).

The illustration of FIG. 11, a view of the rear of the bag 52 taken from the line 11—11 of FIG. 10, shows an illustrative positioning of the zipper 62 along the rear of the bag 52. The zipper 62 may be positioned in any suitable location along this rear wall to suit the convenience of consumers. It is also understood, of course, that the use of a zipper as a fastening means is merely suggestive in nature and is not meant to limit the disclosure. As a final point with respect to FIG. 11, the adjustable frame is shown in its extended position, with handle 24 of the adjustable frame elevated above handle 26 of the stationary frame. A front view of the fastenable bag 52 is given in FIG. 12 whereby one possible suggested outline shape for flap 54 is illustrated. Fastener 56 which fastens the flap 54 to the main segment of the bag 52 can be any one of a number of well known fasteners, such as pivoted clips or snapping devices.

Figure 13:
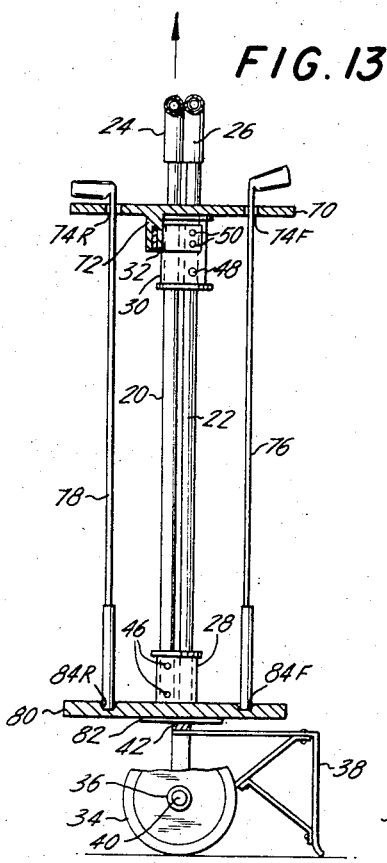
FIG. 13 is a side view of the carrier used as a golf cart.

The invention is sufficiently versatile to permit its use as a portable golf cart as well. The side view of FIG. 13 shows the handles 24 and 26, the side members 20 and 22, slides 28 and 30, upper strut 32, lower strut 42, wheels 34, axle 40, nuts 56 and braces 38, all of which have been previously described. Added to these elements of the carrier are an upper plate 70 with two rows of holes 74R and 74F drilled therein to receive rows of golf clubs inserted therein. The plate 70 is attached to the upper horizontal strut 32 of the carrier through the pedestal 72 of the plate 70; the actual attachment can be made in any one of a number of fashions, including by way of example "sweating," snap-fastening, etc.

At the bottom of FIG. 13 is shown a corresponding lower plate 80 with rows of recesses 84R and 84F aligned under the upper holes 74R and 74F to receive the handles of golf clubs which are inserted through the holes in the upper plate 70. The lower plate 80 is similarly affixed to the lower horizontal strut 42 at the plate pedestal 82 by suitable well-known fastening techniques. Illustrative golf clubs 76 and 78 are inserted through holes in rows 74F and 74R respectively and are held in the carrier when they drop into the corresponding recess depressions in rows 84F and 84R of the bottom plate 80. It is understood that upper and lower plates 70 and 80 are merely illustrative support means for golf clubs; other such means can be similarly utilized.

Referring to FIG. 14, it is seen that the upper plate 70 and the lower plate 80 can comprise a plurality $74F_1-74F_n$ of holes drilled through the upper plate 70 and a similar plurality $84F_1-84F_n$ of aligned recesses in the bottom plate 80. The rear rows of holes and recesses in plates 70 and 80 respectively are similarly fashioned. The selection of the number of holes and recesses to be utilized can depend upon the number of golf clubs normally utilized by the purchaser; for example, a professional golfer might require as many as 14 club positions, while a "weekend" golfer might only need 7 or 8 such positions.

The diagram of FIG. 15 shows a top view of the upper plate 70 taken from the line 15—15 of FIG. 14. This view illustrates the front and rear rows of holes $74R_1-74R_n$ and $74F_1-74F_n$. In addition, the manner in which pedestal 72 of upper plate 70 can be split so as to fastenably fit over upper horizontal strut 32 of the carrier is indicated.

Finally, FIG. 16 is a sectional view of the carrier showing the lower plate 80, taken along the line 16—16 of FIG. 14. The front row of recesses $84F_1-84F_n$ and the rear row $84R_1-84R_n$ are shown in FIG. 16. A phantom view of the pedestal 82 of the lower plate 80 is also indicated, and by reference to FIG. 14, it is noted that the pedestal 82 is above and affixed to the lower horizontal strut 42.

It is to be understood the above-described arrangements are illustrative of the application of the principles of the invention. Numerous other arrangements may be devised by those skilled in the art without departing from the spirit and scope of the invention.

What is claimed is:
1. A convertible carrier for carrying a plurality of objects comprising a stationary frame including at least two parallel side rods and a tubular handle, an extendible frame including at least two parallel side rods and a tubular handle, a fixed upper pair of cylindrical slides fastened to said side rods of said stationary frame and through which said side rods of said extendible frame can pass, a movable lower pair of cylindrical slides fastened to said side rods of said extendible frame and through which said side rods of said stationary frame can pass, a lower cross-brace bridging said side rods of said stationary frame at the bottom thereof, an upper cross-brace bridging said side rods of said stationary frame between said fixed upper pair of cylindrical slides, a pair of support feet adapted to be swivelled about a vertical axis at either end of said lower cross-brace, a pair of wheels axially fastened through said side rods of said stationary frame and through said lower cross-brace, and support means fastenably associated with said upper and said lower cross-braces for providing carrying support for said plurality of objects.

2. A convertible carrier in accordance with claim 1 wherein said extendible frame is disposed coextensively with said stationary frame and said pair of support feet are swivelled to an inner position adjacent to said lower cross-brace, and wherein said support means includes an expandable bag in a first relatively flat position surrounding said side rods of said stationary frame and said extendible frame between said fixed upper pair and said movable lower pair of cylindrical slides, a panel forming a pouch affixed to the inner rear wall of said bag, means for opening and closing said pouch, and an elasticized skirt flexibly enclosing the bottom of said expandable bag and said pair of support feet and said pair of wheels.

3. A convertible carrier in accordance with claim 1 wherein said extendible frame is adjusted to an extended position whereby said tubular handle of said extendible frame is elevated above said tubular handle of said stationary frame with said movable lower pair of said cylindrical slides abutting said fixed upper pair of cylindrical slides, and wherein said support feet are swivelled to an outer position perpendicular to said lower cross-brace, and wherein said support means includes an expandable bag in a second relatively expanded position surrounding said side rods of said stationary frame between said fixed upper pair of cylindrical slides and said lower cross-brace, a raised inner lining mounted above said bag and providing an extension thereto, and an elasticized skirt flexibly surrounding said expandable bag above said lower cross-brace.

4. A convertible carrier in accordance with claim 1 wherein said extendible frame is adjustable to an extended position whereby said tubular handle of said extendible frame is elevated above said tubular handle of said stationary frame with said movable lower pair of cylindrical slides abutting said fixed upper pair of cylindrical slides, and wherein said support feet are swivelable to an outer position perpendicular to said lower cross-brace, and wherein said support means includes a valise mounted on said lower cross-brace and a flexible skirt adapted to surround said support feet, said wheels and the bottom of said valise when said valise is lightly loaded and to surround only the bottom of said valise when said valise is heavily loaded.

5. A convertible carrier in accordance with claim 1 wherein said extendible frame is adjusted to an extended position whereby said tubular handle of said extendible frame is elevated above said tubular handle of said stationary frame with said movable pair of cylindrical slides abutting said fixed upper pair of cylindrical slides, and wherein said support feet are swivelled to an outer position perpendicular to said lower cross-brace, and wherein said support means includes retaining means fastened to said upper cross-brace and adapted to receive a plurality of shafts therethrough and positioning means fastened to said lower cross-brace adapted to removably position said shafts inserted through said retaining means.

References Cited

UNITED STATES PATENTS

| | | |
|---|---|---|
| 1,474,478 | 11/1923 | Huffman. |
| 2,500,588 | 3/1950 | Vosseler et al. 280—36 |
| 2,514,849 | 7/1950 | Dewing 280—47.26 |
| 2,729,460 | 3/1956 | Forman 280—47.26 |
| 2,753,189 | 7/1956 | Conroy et al. 280—40 |
| 2,757,935 | 8/1956 | Sofia 280—47.26 |
| 2,778,654 | 1/1957 | Gottlieb 280—47.26 |
| 3,058,504 | 10/1962 | Powers 150—1.5 |

KENNETH H. BETTS, *Primary Examiner.*